Figure 1:
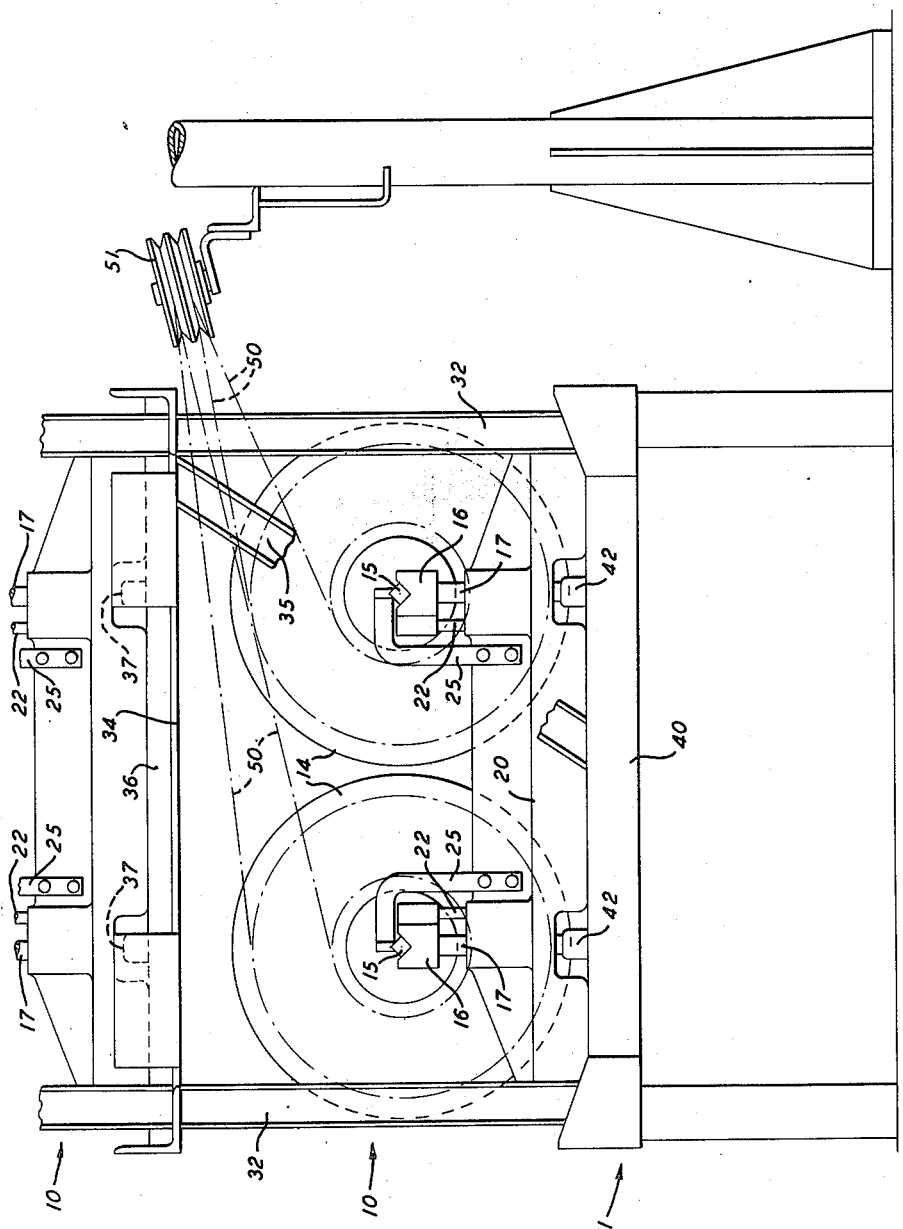

March 6, 1951     A. C. NYSTROM     2,544,348
REEL SUPPORT

Filed June 3, 1947     2 Sheets-Sheet 1

INVENTOR
A.C. NYSTROM
BY
ATTORNEY

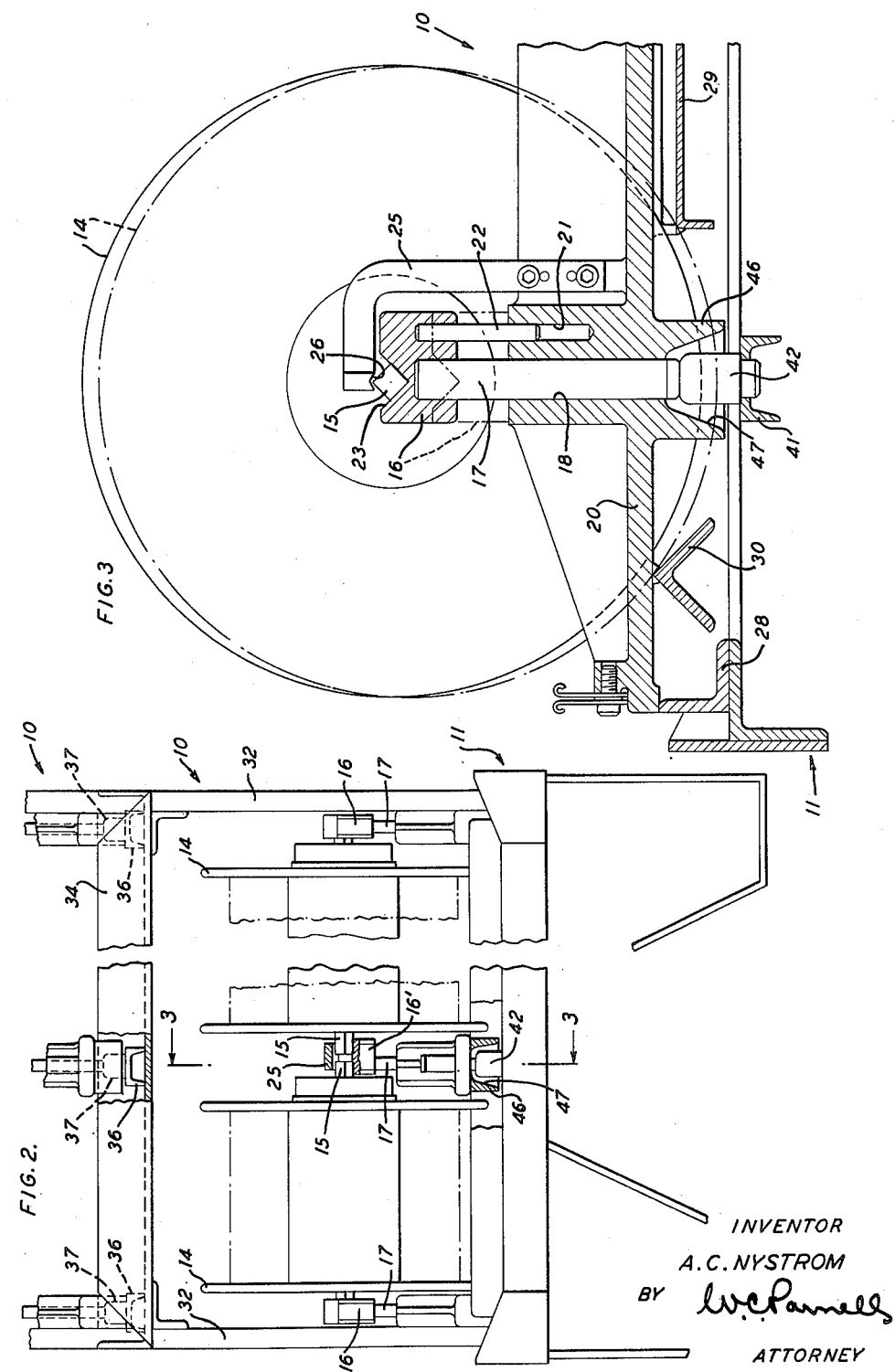

Patented Mar. 6, 1951

2,544,348

UNITED STATES PATENT OFFICE 2,544,348

REEL SUPPORT

Axel C. Nystrom, Rutherford, N. J., assignor to Western Electric Company, Incorporated, New York, N. Y., a corporation of New York Application June 3, 1947, Serial No. 752,203

6 Claims. (Cl. 242—139)

This invention relates to reel supports and more particularly to like pallets for transporting reels and cooperating skids to support the pallets and reels.

In the manufacture of cables for use in the communication arts, pallets have been employed to receive reels of insulated electrical conductors to transport the reels from one processing machine to another, and to support the reels in storage between cable forming processes. At each machine, it has been necessary to remove the reels from the pallets and mount them in conventional supply or takeup reel supporting mechanisms associated with the particular machines. Skids also have been employed to support the pallets either in storage or adjacent the machines during loading or unloading of the reels.

The object of the present invention is to utilize pallets and skids for the additional purpose of supporting reels of material, such as electrical conductors, for rotation whereby they may serve as supply reels without removing them from the pallets.

With this and other objects in view, the invention comprises a support for a reel of material including a pallet and means in the pallet to support the reel for rotation. More specifically the reel has a spindle extending through the hub thereof and the pallet has spaced apertures therein and spaced portions to support the reel. Rods extending through the apertures and movable therein, support notched members at their upper ends to receive the ends of the spindle. A base for supporting the pallet has projections to be engaged by the rods when the pallet is positioned on the base to cause the notched members to engage their ends of the spindle to hold the reel free of the said pallet portions for rotation on the spindle by the pulling of the material from the reel.

The support also includes like pallets with upper and lower portions, the upper portion of each pallet being formed to receive and support a pallet of like structure and including vertical projections disposed in alignment with the movable rods positioned in apertures of the lower portion, whereby the postioning of one pallet upon another will effectively cause elevation of the reels in the upper pallet for rotation on their spindles. The same action occurs by the mounting of any of the pallets on the base or skid which is equipped with projections to be engaged by the reel supporting rods. The grooved members upon the rods are in the form of blocks having V-shaped notches in their upper surfaces to receive the square ends of the spindles and cooperate with stationary retaining elements to hold the spindles against rotation during rotation of the reels and to maintain the ends of the spindles within the blocks.

Other objects and advantages will be apparent from the following detailed description when considered in conjunction with the accompanying drawings, wherein Fig. 1 is an end elevational view of like pallets mounted one upon the other and resting upon a supporting base or skid;

Fig. 2 is a fragmentary side elevational view of the structure shown in Fig. 1; and Fig. 3 is an enlarged fragmentary sectional view taken substantially along the line 3—3 of Fig. 2.

Referring now to the drawings, the invention includes a reel support composed of like pallets indicated generally at 10 and a base or skid 11. The pallets 10 are identical in structure and a description of one will apply to all the pallets. In the present embodiment of the invention, the pallet is formed to house eight reels in two rows of four reels each. The reels 14 are of the standard metal type including hubs through which spindles 15 are disposed. Blocks 16 and 16', having V-shaped notches or grooves 23 in their upper surfaces to receive the square ends of the spindles, are mounted on the upper ends of their respective rods 17 and are of like structures with the exception that some of the blocks vary in width. The blocks 16 at the ends of each roll of reels may be termed single blocks, each one of them supports the end of one spindle 15, while the blocks 16' between the reels in each row are double blocks and are of greater widths to support both ends of the adjacent spindles 15.

The rods 17 extend through apertures 18 in a horizontal lower portion 20 of the pallet. Smaller apertures 21 are formed in the portion 20 parallel with the apertures 18 to receive guide pins 22 carried by the blocks 16 and 16' to hold them and their supporting rods against rotation and to align the groove 23 in the blocks of each row. A retaining element 25, mounted upon the lower portion 20 adjacent each block, has a horizontal upper portion, which extends over its respective block, with a groove 26 near its outer end to extend over the adjacent end of the spindle in its block when in the upper position and to cooperate with the adjacent block to hold the spindle against rotation.

The lower portion 20 of the pallet 10 is supported on angle members 28 secured thereto. The lower portion 20 also has a central member 29 secured thereto and parallel angle members 30 mounted on the under surface of the member 20 at equal spaced positions upon each side of the central member 29, only one of the angle members 30 being shown in the drawings. These members 29 and 30 cooperate to support the rows of reels 14 when initially placed in the pallet and when transported in the pallet from one position to another.

Vertical members 32 of the pallet, secured to the lower portion 20 and the angle members 28, have an upper portion 34 mounted thereon. Suitable bracing members 35, extending between the upper portion 34 and the lower portion 20, add rigidity to the pallet structure leaving open spaces between the lower portion 20 and the upper portion 34, whereby the reels may be readily mounted in or removed from the pallet. The upper portion 34 has laterally extending parallel members 36 with vertical projections 37 mounted at spaced positions in alignment with their respective rods 17 in the apertures 18 of the lower portion 20.

The base or skid 11 includes a supporting portion 40 for one or more pallets disposed thereon, the portion 40 being similar in structure to the upper portion 34 of the pallet and having laterally extending channel members 41 carrying vertical projections 42 at spaced positions in alignment with the projections 37 of the upper portion 34 and also in alignment with the rods 17. The lower member 20 has flanged portions 46 surrounding the lower end of each aperture 18 with truncated cone recesses 47 therein, the walls of which serve as cam-like guides to assure aligning of their respective rods 17 with the projections 42 of the base or skid 11 or the projections 37 of a like pallet 10.

The pallets 10 are loaded with reels filled with material such as insulated electrical conductors. The filled pallets may be transported to a s.orage area or to a machine where the insulated electrical conductors are to be formed into a cable structure. The pallets may be transported in the conventional manner by the insertion of the lifting arms of a conveyor through either side of the pallet beneath the upper portion 34 thereof. While the pallet filled with reels is being transported from one position to another, the reels 14 will rest upon the portions 29 and 30 of the pallet. The rods 17 in this instance will be in their lowermost positions where the blocks 16 will rest upon the upper surface of the lower member 20. The rods 17 with their blocks 16 are also in this position when the reels are rolled into the pallet, the pallet at that time being supported on the floor or on a plane skid not equipped with the projections 42.

When the pallet reaches the position adjacent the machine where the bases or skids 11 are disposed, the pallet is lowered upon one of the skids. During its downward movement, the pallet will be accurately located upon the skid through the guiding action of the surfaces of the recesses 47 cooperating with the projections 42, whereby the rods 17 will engage the projections to limit the downward movement of the rods and their blocks 16 during continued downward movement of the pallet until it comes to rest upon the support 40. During this action, the ends of the spindles 15 in the reels will be lowered until they meet their blocks where they will be held to support the reels above their supporting members 29 and 30 for rotation as their conductors 50 are pulled off the reels and directed around sheaves 51 to the machine (not shown). After the ends of the spindles 15 come to rest in their blocks, the pallet, including the supporting members, continues its downward movement until it comes to rest on the skid 11.

The same action takes place, by the lowering of a second pallet upon the first pallet, as took place by the lowering of the first pallet upon the supporting base or skid 11. In this instance, the projections 37 of the upper portion 34 of the first pallet will engage the rods 17 of the second pallet effectively elevating these rods or holding them against downward movement while the second pallet comes to rest upon the upper portion 34 of the first pallet. In this manner the reels of the second pallet are supported for rotation on their spindles carried by the blocks 16 and 16' on the supporting rod 17 of the second pallet.

As will be clear from the foregoing description, each pallet of this structure continuously supports eight reels while they are being transported from one machine to another, while the material is being removed from the reels and while the reels are being returned to the reloading location. The use of this structure, therefore, greatly reduces the labor of handling of the reels and makes it unnecessary to provide reel supporting mechanism at the machine to which the material is supplied.

Although specific improvements of the invention have been shown and described, it will be understood that they are but illustrative and that various modifications may be made therein without departing from the scope and spirit of this invention as defined by the appended claims.

What is claimed is:

1. A transportable support for a reel of material having a spindle extending through its hub, the support comprising a pallet for use in transporting the reel from one posi.ion to another, the pallet having spaced apertures therein and spaced portions to support the reel while being transported, rods extending through the apertures and movable therein, notched members disposed on the upper ends of the rods to receive the ends of the spindle, a base to support the pallet, and projections carried by the base to be engaged by the rods when the pallet is positioned on the base to cause the notched members to engage their ends of the spindle to hold the reel free of the said pallet portions for rotation on the spindle by the pulling of the material from the reel.

2. A support for a reel of material having a spindle extending through its hub, the support comprising a pallet having a lower por.ion and an upper portion, the upper portion having spaced vertical projections and formed to support a pallet of like structure, the lower portion having vertical apertures at spaced positions in alignment with the projections and also spaced elements to support the reel, rods extending through the apertures of the lower member and movable therein, and notched members disposed on the upper ends of the rods beneath the ends of the spindle whereby the reel will be held thereby for rotation on the spindle when the pallet is positioned upon the upper portion of a like pallet causing the said projections thereof to engage the rods to hold them elevated to position the reel free of the spaced elements.

3. A transportable support for a reel of material having a spindle extending through its hub, the support comprising a pallet for use in transporting the reel from one position to another, the pallet having spaced apertures therein and spaced portions to support the reel while being transported, rods extending through the apertures and movable therein, notched members disposed on the upper ends of the rods to receive the ends of the spindle, means to hold the rods against rotation to maintain the notches of the members in alignment with each other, a base to support the pallet, and projections carried by the base to be engaged by the rods when the pallet is positioned on the base to cause the notched members to engage their ends of the spindle to hold the reel free of the said pallet portions for rotation on the spindle by the pulling of the material from the reel.

4. A transportable support for a reel of material having a spindle with flat sided ends extending through its hub, the support comprising a pallet for use in transporting the reel from one position to another, the pallet having spaced apertures therein and spaced portions to support the reel while being transported, rods extending through the apertures and movable therein, blocks mounted on the upper ends of the rods to receive the ends of the spindle, an element to support the pallet, and projections carried by the element to be engaged by the rods when the pallet is positioned on the element to cause the blocks to engage their ends of the spindle to hold the reel free of the said pallet portions for rotation on the spindle by the pulling of the material from the reel.

5. A transportable support for a reel of material having a spindle with flat sided ends extending through its hub, the support comprising a pallet for use in transporting the reel from one position to another, the pallet having spaced apertures therein and spaced portions to support the reel while being transported, rods extending through the apertures and movable therein, blocks mounted on the upper ends of the rods to receive the ends of the spindle, an element to support the pallet, projections carried by the element to be engaged by the rods when the pallet is positioned on the element to cause the blocks to engage their ends of the spindle to hold the reel free of the said pallet portions for rotation on the spindle by the pulling of the material from the reel, and retaining elements mounted in the pallet and extending over the blocks to cooperate therewith in holding the spindle against rotation.

6. A transportable support for a reel of material having a spindle extending through its hub, the support comprising a pallet for use in transporting the reel from one position to another, the pallet having spaced apertures therein and spaced portions to support the reel while being transported, rods extending through the apertures and movable therein, notched members disposed on the upper ends of the rods to receive the ends of the spindle, a base to support the pallet, projections carried by the base to be engaged by the rods when the pallet is positioned on the base to cause the notched members to engage their ends of the spindle to hold the reel free of the said pallet portions for rotation on the spindle by the pulling of the material from the reel, and guide members in the pallet adjacent the rods to guide the rods into engagement with the projections of the base while the pallet is disposed on the base.

AXEL C. NYSTROM.

REFERENCES CITED

The following references are of record in the file of this patent:

UNITED STATES PATENTS

| Number | Name | Date |
|---|---|---|
| 1,836,815 | Reeves | Dec. 15, 1931 |
| 1,855,877 | Blood et al. | Apr. 26, 1932 |
| 1,895,217 | Van Vorst | Jan. 24, 1933 |
| 2,266,446 | Sluyter | Dec. 6, 1941 |